UNITED STATES PATENT OFFICE.

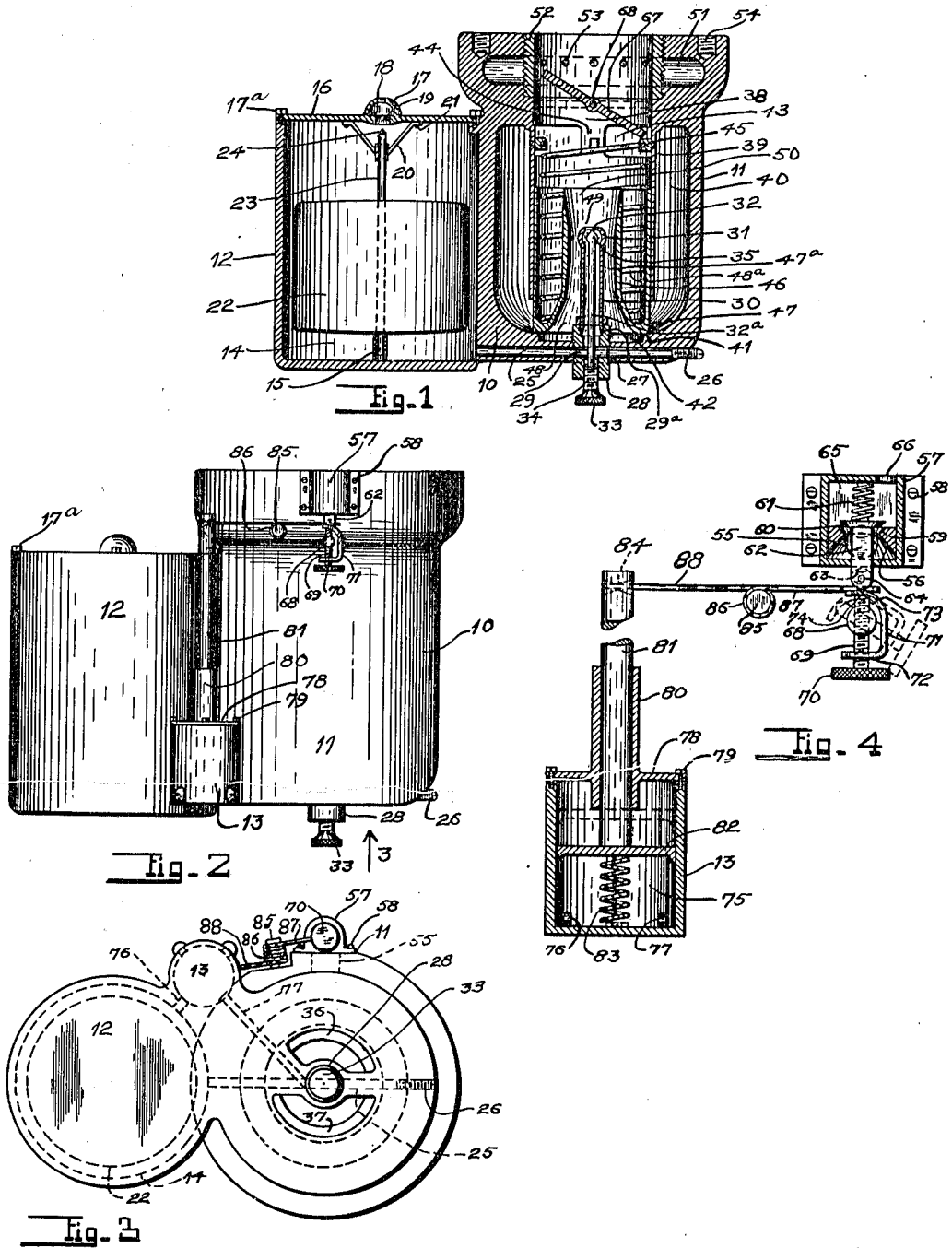

JAMES L. MUNSON, OF SPARTA, NEW JERSEY.

CARBURETER.

1,228,692. Specification of Letters Patent. Patented June 5, 1917.

Application filed May 2, 1916. Serial No. 94,927.

*To all whom it may concern:*

Be it known that I, JAMES L. MUNSON, a citizen of the United States, residing at Sparta, in the county of Sussex and State of New Jersey, have invented certain new and useful Improvements in Carbureters; and I do hereby declare the following to be a full, clear, and exact description of the invention, such as will enable others skilled in the art to which it appertains to make and use the same.

My invention relates to carbureters for internal combustion engines, and the object of my invention is to provide a carbureter especially adapted for use in automobiles.

In carrying out my improvement I make use of the following instrumentalities.

In the drawings:—

Figure 1: is a sectional view of my improved carbureter, the section being taken on a plane passing through the center of the float chamber and the center of the carbureting chamber.

Fig. 2: is a side view of my improved carbureter.

Fig. 3: is a view of Fig. 2 looking in the direction of the arrow 3 in the latter figure; and Fig. 4: is a detail view of some of the parts.

10 is a casing preferably formed of cast metal and formed substantially with 3 cylindrical portions 11, 12 and 13.

The cylindrical portion 12 is provided with an interior float chamber 14, having a guide 15 located in the center of the bottom and provided with a top 16 secured thereto by screws 17ª.

The top 16 is provided with a boss 17 formed integrally therewith and the boss has a hole 18 in which is to be screwed or otherwise secured a pipe, not shown, which leads to a source of fuel, preferably gasolene.

The top 16 is also provided with a tapered hole 19 and with a guide 20 secured to the top 16 by screws 21. A float 22 formed of varnished cork or of a thin light metal is rigidly secured to the pintle 23, the lower end of the pintle 23 slides freely in the guide 15 and the upper end of the pintle 23 slides freely in the guide 20. The upper end of the pintle 23 is provided with a conical portion 24 adapted to enter the tapered hole 19 and shut off the passage of the gasolene to the float chamber 14 when the level of the gasolene therein has reached a predetermined point. A duct 25 is drilled through the bottom of the cylindrical portion 11, the outer end of said duct being closed by the screw 26.

A threaded hole 27 is provided in the bottom of the cylindrical portion 11 and a plug 28 is screwed into the hole 27. The plug 28 is provided with a hole 29 registering with the duct 25, and the upper end of said plug is provided with a threaded hole 29ª in which is secured the fuel nozzle 30. The nozzle 30 is enlarged as at 31 at its upper end and is provided with an opening 32.

A valve stem 32ª having a knurled head 33 is provided with a threaded portion 34 which screws within a correspondingly threaded hole provided in the lower portion of the plug 28. The upper portion of the valve stem is provided with an enlarged portion 35 adapted to coöperate with the hole 32 in regulating the flow of gasolene from the float chamber to the carbureting chamber.

The bottom of the cylindrical portion 11 is not entirely closed. Two openings 36 and 37 are provided therein for the passage of the air to the mixing chamber as hereinafter explained.

The cylindrical portion 11 is provided with a mixing chamber 38 and with a tube shaped portion 39 depending from the lower portion of said chamber. A cylindrical air chamber 40 surrounds the tube 39 and the lower portion of the air chamber 40 terminates in a valve seat 41 for a purpose hereinafter explained. A cylindrical chamber 42 is provided between the valve seat 41 and the bottom of the cylindrical portion 11.

The upper portion of the tube 39 is provided with any suitable number of openings 43 for a purpose hereinafter explained. The portions 44 of the tube 39 between the openings 43 are provided with studs 45 for a purpose hereinafter explained.

A valve 46 has an annular portion 47 which is normally kept in contact with the valve seat 41 by the spring 48ª. The lower end of said spring bears against the bottom of the valve 46 and the upper end of said spring is threaded through holes provided in the studs 45.

The valve 46 is provided with a venturi 47ª having a funnel shaped opening 48, the large portion of said opening being downward, with a substantially cylindrical portion 49 adjacent the hole 32 of the fuel nozzle and with a top opening 50 the larger part of said opening being directed upward. An annular heating chamber 51 is formed in the upper part of the cylindrical portion 11 and a tube 52 provided with a plurality of openings such as 53 is screwed into the upper part of the cylindrical portion 11.

Threaded holes such as 54 serve to secure the carbureter to the eduction pipe.

The heating chamber 51 is connected by the opening 55 with one portion 56 of the valve chamber 57. The valve chamber 57 is secured to the upper part of the portion 11 by screws such as 58.

The valve chamber 57 is provided with a valve opening 59, and with a valve 60 adapted to close said opening. The pressure of the spring 61 serves to keep the valve 60 normally seated upon the valve opening 59 and said valve is provided with a stem 62 having a roller 63 which revolves freely upon the pintle 64. The upper portion 65 of the valve chamber 57 is provided with a hole 66 by means of which the portion 65, and a tube not shown, connected in any approved manner with said hole, has its other end placed in proximity to the exhaust pipe of the engine so that the heated air will be delivered to the portion 65 of the valve chamber 57 for a purpose hereinafter referred to. A throttle valve 67 is provided in the mixing chamber 38 and said valve is rigidly mounted upon the pintle 68. The outer end of the pintle 68 is provided with a threaded hole in which there is mounted the tightly fitting screw 69, the lower end of which is provided with a knurled head 70. A cam 71 has its lower portion 72 threaded upon the screw 68 and its upper portion is curved as at 73 and is provided with a depression 74 in which rests the upper end of the screw 69.

The cylindrical portion 13 is bored out on the interior so as to provide an auxiliary fuel reservoir 75 which is connected by means of the duct 76 with the float chamber 14 and by means of the duct 77 with the duct 25. The location of the juncture of the ducts 25 and 77 is preferably adjacent the valve stem 32ª. The upper portion of the cylindrical portion 13 is closed by the head 78 which is secured to said portion by screws such as 79. The head 78 is provided with a boss 80 having a central hole in which freely slides the piston rod 81, the lower end of which is secured to or formed integrally with the piston 82. The spring 83 normally serves to keep the piston 82 in the position shown dotted in Fig. 4. The upper end of the piston rod 81 is provided with a hole 84 which is preferably tapered on both sides from the center outward as shown.

The stud 85 is secured in any approved manner to the cylindrical portion 11 and a spring has its coiled portion 86 mounted upon the stud 85, one end 87 of said spring rests between the roller 64 and the curved portion 74 of the cam 71, and the other end 88 of the said spring passes through the hole 84 in the piston rod 81.

The operation of my improved carbureter is as follows: Gasolene being allowed to flow through the opening 18 until the float chamber 14 is filled to the proper level, the gasolene will then flow through the duct 25 and up through the fuel nozzle 30 nearly to the hole 32. Gasolene will also flow through the duct 76 to the auxiliary reservoir 75 and through the duct 77 to the duct 25.

When the engine is to be started the throttle valve 67 will be turned from the dotted position to the full position shown in Fig. 1. During this motion of the throttle valve the cam 71 will move from the position shown dotted in Fig. 4 to the position shown full in said figure. If said motion is rapidly accomplished it is evident that the spring arms 87 and 88 will be rapidly flexed and the spring arm 88 will push the piston 82 rapidly downward against the pressure of the spring 83. The piston 82 will then give a sudden shock upon the gasolene in the ducts 76 and 77 and the shock upon the gasolene in the latter duct will cause the gasolene to squirt rapidly through the opening 32 and thus I provide for automatic priming.

It is also evident that when the cam 71 moves as just described, that the valve 60 will be raised from the valve opening 59 and consequently hot air will flow through said opening to the opening 55 thence to the heating chamber 51 and through the holes 53 for a purpose hereinafter described.

When the engine is started, air passes through the openings 36 and 37 and into the venturi of the valve 46. During the passage of the air through the said venturi past the opening 32, gasolene will be drawn through said opening and mixed with the air in the mixing chamber 38 and as said air passes upwardly it will receive an admixture of heated air through the openings 53. It is evident that the blasts of hot air coming through the openings 53 will greatly increase the dispersion of the gasolene in the air current and thus secure a more perfect mixture.

When the engine is running slowly the air passes as just explained, and should the speed of the engine increase the pressure of the incoming air against the annular portion 47 of the valve 46, will cause said valve to lift against the pressure of the spring 48ª and permit additional air to pass between the valve seat 41 and the annular portion 47 of the valve 42. Said air passes upward through the cylindrical space 40 and thence through the openings 43 into the mixing chamber 38 where it mixes with the gasolene and the air which came through the venturi of said valve.

It will be seen that I provide a carbureter which has means for automatic priming and which provides for an automatic dilution of the mixture with air, the amount of the dilution depending upon the speed of the engine.

It it also evident that I provide for a variable heating of the mixture, the amount of the heating depending upon the opening of the butter fly valve.

I claim:—

1. The combination with a float chamber, throttle valve and a fuel nozzle, of an auxiliary reservoir, conduits connecting said chamber, fuel nozzle and reservoir, a piston in said reservoir, a spring fulcrumed between its ends and having one end connected to said piston and connections between the other end of said spring and said throttle valve.

2. The combination with a mixing chamber, of a throttle valve mounted therein, a tube depending from said chamber, a tubular air valve slidably mounted in said tube and having a lower annular valve face and a venturi, a fuel nozzle mounted in said venturi, an air chamber surrounding said tube and provided with a valve seat at its lower end and with openings to said carbureting chamber at its upper end, and a spring for forcing said face against said seat.

3. The combination with a source of fuel, of a fuel nozzle connected thereto, an auxiliary reservoir and a piston therein, a conduit connecting said nozzle and reservoir, a throttle including a shaft, a cam on said shaft, and a yielding connection between said cam and said piston for moving said piston to force fuel from said reservoir to said nozzle.

4. The combination with a source of fuel, of a fuel nozzle connected thereto, an auxiliary reservoir and a piston therein, a conduit connecting said nozzle and reservoir, a throttle including a shaft, a cam on said shaft, a yielding connection between said cam and said piston for moving said piston in one direction, and a spring for moving said piston in the opposite direction.

In testimony whereof, I affix my signature.

JAMES L. MUNSON.